United States Patent
Senour

[15] 3,667,041
[45] May 30, 1972

[54] AUTOMATIC ZERO CIRCUITRY FOR INDICATING DEVICES

[72] Inventor: Donald A. Senour, Carlisle, Mass.
[73] Assignee: BLH Electronics, Inc., Waltham, Mass.
[22] Filed: Dec. 4, 1969
[21] Appl. No.: 882,000

[52] U.S. Cl. ..........................324/130, 73/88.5 R, 324/123 R
[51] Int. Cl. .........................................G01r 1/02, G01r 1/30
[58] Field of Search ...............324/123, 130, 99 R, 65 B, 115; 330/9; 73/88.5

[56] References Cited

UNITED STATES PATENTS

| | | | |
|---|---|---|---|
| 2,467,752 | 4/1949 | Howe | 324/65 B |
| 3,237,116 | 2/1966 | Skinner et al. | 330/9 |
| 3,368,149 | 2/1968 | Wasserman | 324/99 R |
| 3,541,446 | 11/1970 | Prozeller | 324/130 X |
| 3,148,366 | 9/1964 | Schulz | 324/130 X |
| 3,242,489 | 3/1966 | Leyde | 324/130 X |
| 3,430,227 | 2/1969 | Hillis | 324/130 X |
| 3,501,696 | 3/1970 | Riley | 324/130 X |
| 3,509,460 | 4/1970 | Mizrahi | 324/130 X |
| 3,510,770 | 5/1970 | Lowe | 324/130 |
| 3,529,249 | 9/1970 | Jasper et al. | 324/130 X |
| 3,532,980 | 10/1970 | Tucker | 324/130 X |

Primary Examiner—Rudolph V. Rolinec
Assistant Examiner—Ernest F. Karlsen
Attorney—Thomson & Mrose

[57] ABSTRACT

Automatic zero circuitry for low-level signal indicating devices is provided which includes a capacitor at the output of an amplifier for storing a charge, during a given period of time, equal to the drift or offset voltage of the amplifier such that during a measuring period of time, the indicating device will give a true and correct reading. A dual slope integrator in combination with a plurality of field-effect-transistors enables the proper time periods for the storing and reading operations described above.

1 Claims, 1 Drawing Figure

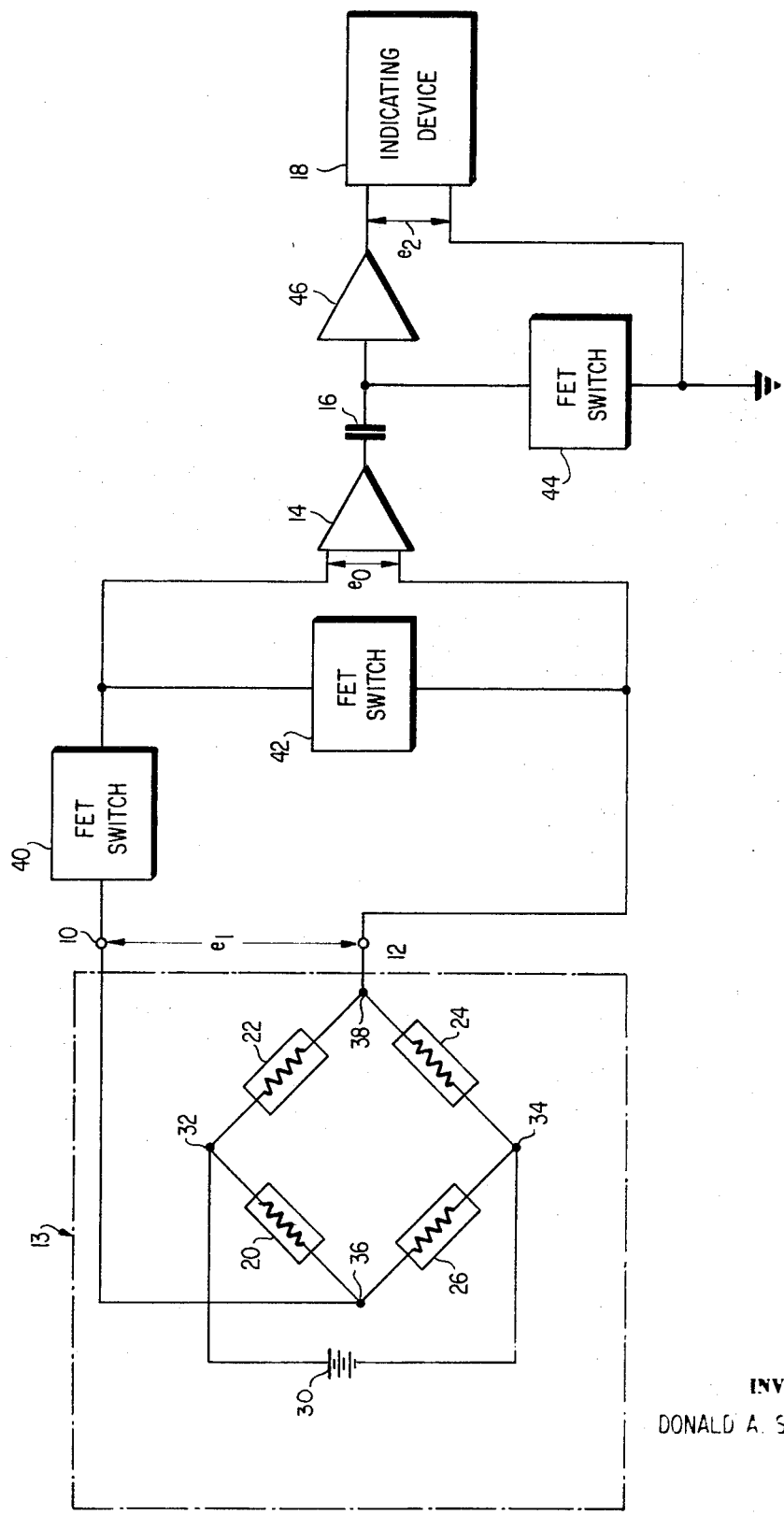

AUTOMATIC ZERO CIRCUITRY FOR INDICATING DEVICES

BACKGROUND OF THE INVENTION

The present invention relates to automatic zero circuitry for indicating devices and more particularly to a novel and improved automatic zero circuitry for reducing drift in indicating devices such that accurate measurements of low level signals can be readily made.

In the past, a problem that existed with indicating devices of either the analog or digital type in the measurement of low-level signals, such as in the millivolt range, was that the amplifiers thereof had a tendency to drift with a change in time or temperature and thereby produce an offset error or voltage. For example, in one prior art indicating device, the drift was found to vary from 10 to 15 microvolts a day and could accumulate to over 100 microvolts over the period of a week. The above-mentioned drifting becomes intolerable in the making of high accuracy measurements such, for example, as in weighing systems using transducive strain gage elements and the like as the force responsive elements therein.

One attempt to reduce the problem of drift in indicating devices has been to use chopper stabilized amplifiers. While somewhat satisfactory, the chopper stabilized amplifier is of complex circuitry and expensive. Additionally, the chopper stabilized amplifier having a single ended input is subject to noise, 60-cycle pickup and the like.

SUMMARY OF THE INVENTION

Accordingly, it is one object of the subject invention to provide a new and improved automatic zero circuitry for indicating devices used in the measurement of low-level signals.

Another object of the present invention is the provision of unique automatic zero circuitry for reducing drift in indicating devices whereby low-level signals can be accurately measured.

Still another object of this invention is to provide a new and improved automatic zero circuitry for indicating devices which utilize a dual slope integrating device to enable the time periods needed for compensating for any error by amplifier drifting.

One other object of the present invention is the provision of a unique automatic zero circuitry for eliminating errors due to amplifier offset voltage in a device for measuring the low-level output signals from a wheatstone bridge arrangement which includes strain gage responsive elements mounted in the arms thereof.

By way of a summary account of practice of this invention in one of its aspects, a low-level signal is accurately measured by storing during a given period of time a signal equal to the offset voltage of the system amplifier so that, during the period of time in which the input signal is integrated and measured by a dual-slope integrator, the offset voltage will be eliminated therefrom and a true reading obtained.

BRIEF DESCRIPTION OF THE DRAWING

A more complete appreciation of the invention and many of the attendant advantages thereof will be readily apparent as the same becomes better understood by reference to the following detailed description when considered in connection with the accompanying solitary view which schematically illustrates the automatic zero circuitry for indicating devices according to the present invention.

DETAILED DESCRIPTION OF THE PREFERRED EMBODIMENT

Referring now to the drawing, the automatic zero circuitry according to the present invention is shown as including a pair of input terminals 10 and 12 for receiving a low-level signal to be measured. The input signal to be measured could be any low-level voltage signal, such as in the millivolt range, and could represent the output from strain gages, load cells, pressure cells, thermocouples or the like.

For example, in the FIGURE, the input terminals 10 and 12 are shown as being connected to the output of a wheatstone bridge circuit arrangement 13 having four electrical strain gages responsive elements 20, 22, 24 and 26 connected in the respective arms thereof. The Wheatstone bridge circuit is DC excited by a power source 30 and the same is connected to a first pair of joining arms points 32 and 34. The output voltage $e_1$ from the bridge circuit arrangement is taken across a second pair of joining arm points 36 and 38 for application to the input terminals 10 and 12 of the automatic zero circuitry. It should be understood that initially the bridge circuit arrangement will be in a balanced condition and provide a zero output voltage therefrom. When the strain gage elements 20, 22, 24 and 26 within the bridge circuit arrangement are subjected to strain, such as by having a force applied to the strain gage elements, which may be mounted upon a weighing platform or the like, then the bridge circuit arrangement will unbalance and provide an output voltage therefrom in an amount proportional to the measurement being made.

In the preferred embodiment of the automatic zero circuitry according to the present invention, there is provided an amplifier 14, which may be a conventional DC differential amplifier, operational amplifier or the like for amplifying the low level input signals to a readable level. The problem with existing low-level indicating systems, of either the analog or digital type, is that the amplifiers therein have a tendency to drift with change in temperature and time and thereby produce an output voltage which can substantially affect the accuracy of measurement of low level signals.

In overcoming the above problem, in one of its aspects, the circuitry of the subject invention utilizes a capacitor 16 to store during a given period of time a charge equal to that of the drift or offset voltage of the amplifier 14 in such a fashion that the offset voltage will be subtracted from the true indicator reading immediately before each reading is taken. More particularly, there is provided in the preferred embodiment of the subject invention, a conventional dual slope integrator within the indicating device 18 which will, during a given period of time, integrate up the input signal and during another period of time, will integrate down with respect to a reference input until the zero level is reached. By integrating in such a fashion, a measurement of the input signal can be obtained. The automatic zero circuitry utilizes the above-mentioned differing periods of time to allow compensation for any drift before a measurement is made. More specifically, during the integrating down period of time of the dual slope integration, a field-effect-transistor (FET) switch 40, connected in series with one of the inputs to amplifier 14, is open, while field-effect-transistor switch 42, connected across the input to amplifier 14, and switch 44, connected across the output of the capacitor 16 and ground, are closed. The capacitor 16 will therefore charge up to a voltage equal to that of the output of the amplifier 14, namely, $ke_0$ where $k$ is the amplifier gain constant. During still another dead time period, the field-effect-transistor switch 40 is closed, while the field-effect-transistor switches 42 and 44 are opened to allow the amplifier 14 to stabilize to a voltage equal to $ke_1$, where $e_1$ is the low voltage input signal to be measured. Now, since the voltage across the capacitor 16 is equal to $ke_0$, then the voltage seen by the indicator 18 during the measuring or integrating up period of time of the dual-slope integrator will be equal to that of $ke_1$ to give a correct and true reading. In other words, any error due to the amplifier offset voltage has been eliminated.

It should further be understood that since, as described, the indicating device 18 is digital and incorporates a dual-slope integrator therein which is a low impedance device, a conventional buffer amplifier 46 has been provided. It should also be understood, however, that the invention is not limited to the use of the dual slope integrator, and that other types of devices which provide differing periods of time, such, for example, as a ramp volt meter, could readily be utilized to re-zero the system prior to the reading of a measurement. Likewise, it should be understood that while the subject invention has been described as utilizing field-effect-transistor switches, that if desired, other switches such as relays or the like could readily be utilized.

Accordingly, it should be understood that the specific embodiments and practices herein described have been presented by way of disclosure rather than limitations, and that various modifications, combinations and substitutions may be effected by those skilled in the art without departure in spirit or scope from this invention in its broader aspects and as set forth in the appended claims.

What is claimed as new and useful and desired to be secured by Letters Patent of the United States is:

1. Automatic zero circuitry for eliminating errors due to DC amplifier offset voltage comprising a DC-excited Wheatstone bridge arrangement including strain gage elements in the arms thereof and producing low-level DC output signals as the result of unbalance thereof, measuring and indicating means including a dual-slope integrator, a DC amplifier for amplifying said output signals and applying related DC voltage signals to said dual-slope integrator, a capacitor for storing voltage equal to the offset voltage of said amplifier, and switch means for periodically interrupting input to said amplifier while simultaneously connecting said capacitor for storage of said voltage during first periods and for periodically connecting the said low-level DC output signals to said amplifier while simultaneously applying to said dual-slope integrator the voltage across said capacitor in opposing relation to said DC voltage signals from said amplifier during second periods alternating with said first periods, said switch means comprising a first field-effect-transistor switch connected in series with said input to said amplifier, a second field-effect-transistor switch connected across said input to said amplifier, and a third field-effect-transistor switch connected between said capacitor and ground potential, said dual-slope integrator including means which, during said second periods, integrates up the voltage signals from said amplifier with the voltage across said capacitor subtracted therefrom, and which integrates down with respect to a reference input and passes through a dead time period during periods including said first periods, said first switch being off and said second and third switches being on during said first periods and said first switch being on and said second and third switches being off during said second periods, whereby error due to said DC amplifier offset voltage is eliminated from measurements by said dual-slope integrator.

* * * * *